United States Patent
White et al.

(10) Patent No.: US 11,104,032 B2
(45) Date of Patent: Aug. 31, 2021

(54) TOOLING ASSEMBLY HAVING CAM CLOSING FEATURE

(71) Applicant: General Electric Company, Schenectady, NY (US)

(72) Inventors: Joel Primmer White, Cincinnati, OH (US); Darrell Glenn Senile, Oxford, OH (US); Thomas Samuel Holaday, Park Hills, KY (US)

(73) Assignee: General Electric Company, Schenectady, NY (US)

( * ) Notice: Subject to any disclaimer, the term of this patent is extended or adjusted under 35 U.S.C. 154(b) by 526 days.

(21) Appl. No.: 15/957,064

(22) Filed: Apr. 19, 2018

(65) Prior Publication Data

US 2019/0322004 A1 Oct. 24, 2019

(51) Int. Cl.
| | |
|---|---|
| *B29C 33/26* | (2006.01) |
| *B28B 7/00* | (2006.01) |
| *B28B 3/02* | (2006.01) |
| *F01D 5/28* | (2006.01) |
| *B29C 33/20* | (2006.01) |

(Continued)

(52) U.S. Cl.
CPC ............ *B28B 7/0014* (2013.01); *B23Q 3/063* (2013.01); *B28B 1/52* (2013.01); *B28B 3/02* (2013.01); *B28B 3/021* (2013.01); *B28B 7/0097* (2013.01); *B29C 33/202* (2013.01); *B29C 33/26* (2013.01); *B29C 33/303* (2013.01); *F01D 5/282* (2013.01);
(Continued)

(58) Field of Classification Search
CPC ....... B28B 7/0014; B28B 7/0087; B28B 1/52; B23B 3/02; B23B 3/021; B29C 33/202; B29C 33/26; B29C 33/303

USPC ......................................................... 425/110
See application file for complete search history.

(56) References Cited

U.S. PATENT DOCUMENTS

| | | | |
|---|---|---|---|
| 4,643,663 | A | 2/1987 | Bowles et al. |
| 4,738,814 | A | 4/1988 | Bowles et al. |

(Continued)

FOREIGN PATENT DOCUMENTS

| | | |
|---|---|---|
| CN | 101304858 A | 11/2008 |
| EP | 1316400 A1 | 6/2003 |

(Continued)

OTHER PUBLICATIONS

Extended European Search Report Corresponding to Application No. 19169485 dated Jul. 15, 2019.

(Continued)

*Primary Examiner* — Jeffrey M Wollschlager
*Assistant Examiner* — Xue H Liu
(74) *Attorney, Agent, or Firm* — Dority & Manning, P.A.

(57) ABSTRACT

Tooling assemblies and methods for using a tooling assembly to shape an article are provided. For example, a tooling assembly has a forward end and an aft end and comprises a first tool segment, a second tool segment, a forward cam portion near the forward end, and an aft cam portion near the aft end. The forward cam portion defines a follower surface, and at least a portion of the follower surface has a curvilinear profile. The aft cam portion defines a first surface extending at a first angle and a second surface extending at a second angle. The first and second tool segments define a cavity for shaping an article. An exemplary method comprises positioning an article preform within the cavity and inserting a fastener within the aft end of the tooling assembly until the fastener is fully inserted within the tooling assembly.

19 Claims, 6 Drawing Sheets

(51) Int. Cl.
  *B23Q 3/06*  (2006.01)
  *B28B 1/52*  (2006.01)
  *B29C 33/30*  (2006.01)

(52) U.S. Cl.
  CPC .. *F05D 2220/32* (2013.01); *F05D 2300/6033* (2013.01)

(56) References Cited

U.S. PATENT DOCUMENTS

| | | |
|---|---|---|
| 5,080,569 A | 1/1992 | Gubernick et al. |
| 5,524,341 A | 6/1996 | Ferleger et al. |
| 7,569,172 B2 | 8/2009 | Pietraszkiewicz et al. |
| 7,726,962 B2 | 6/2010 | Aramburu et al. |
| 7,862,325 B2 | 1/2011 | Pietraszkiewicz et al. |
| 8,511,134 B2 | 8/2013 | Brennand et al. |
| 8,763,678 B2 | 7/2014 | Quach et al. |
| 8,770,966 B2 | 7/2014 | Schibsbye |
| 2011/0073237 A1 | 3/2011 | Rajasingam |
| 2016/0230568 A1 | 8/2016 | Sippel et al. |

FOREIGN PATENT DOCUMENTS

| | | |
|---|---|---|
| GB | 2047131 A | 11/1980 |
| JP | 2008/232141 A | 10/2008 |

OTHER PUBLICATIONS

Chinese Search Report Corresponding to Application No. 2019103171705 dated Jun. 11, 2020.

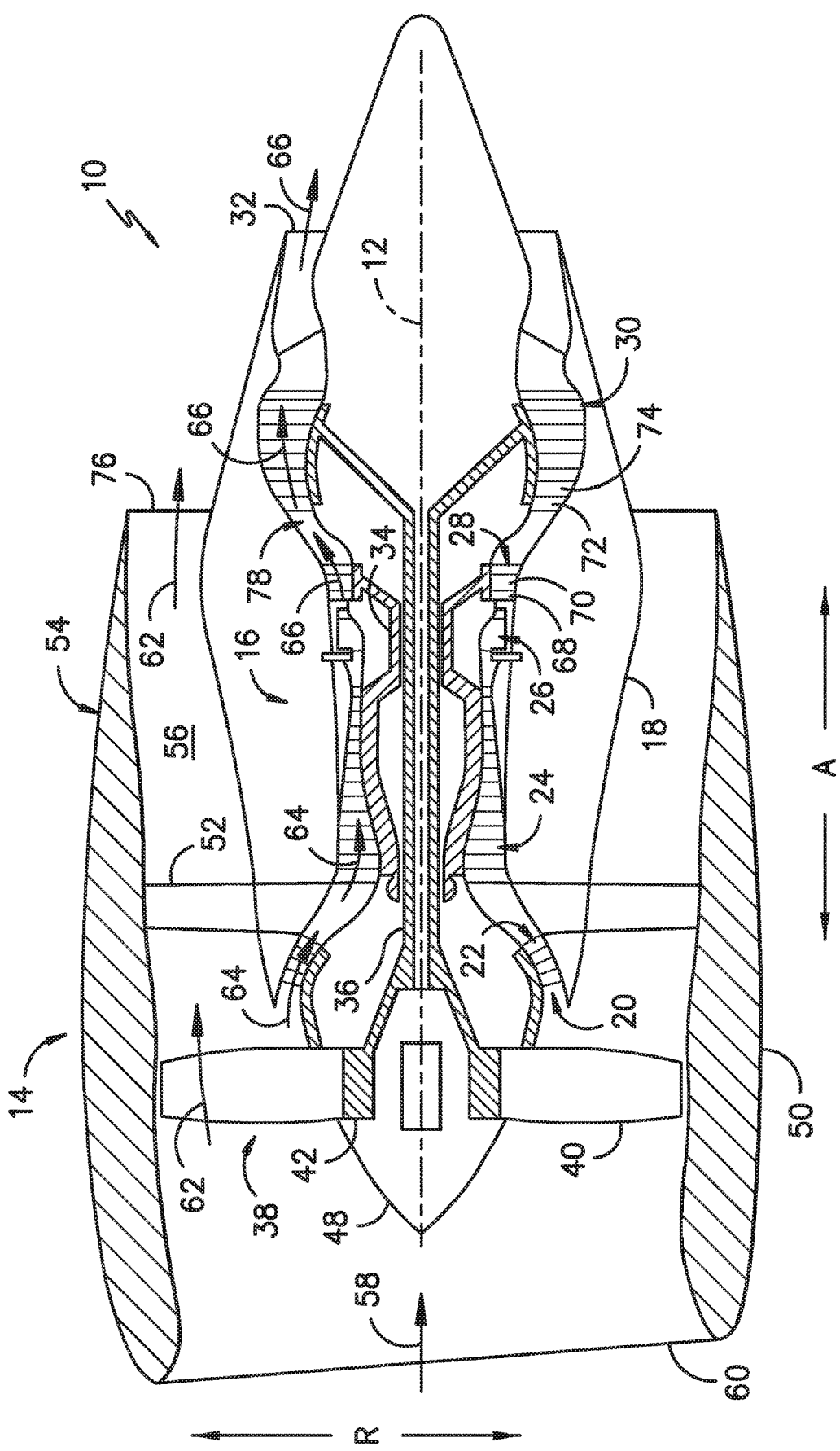
FIG. -1-

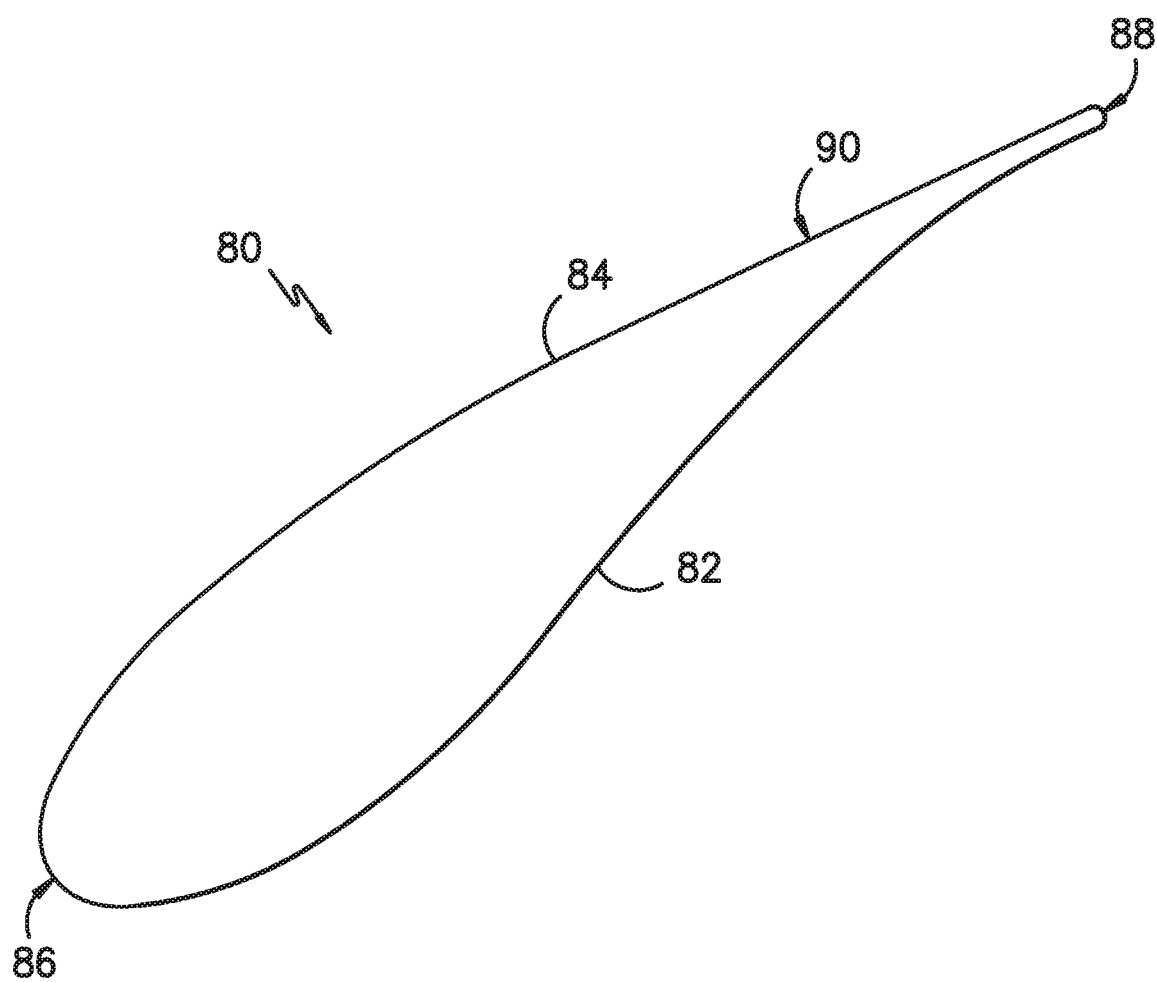
FIG. -2-

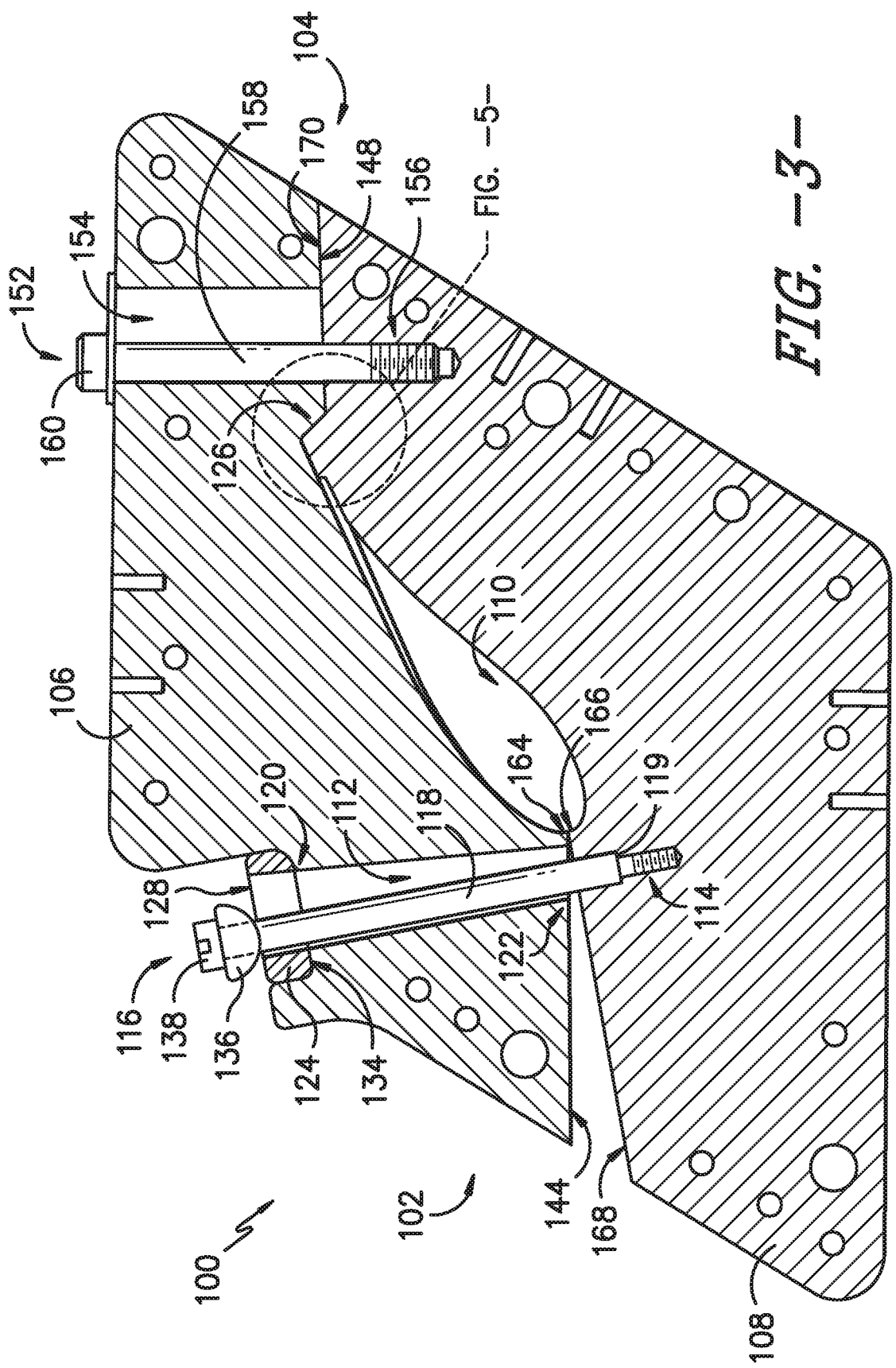
FIG. -3-

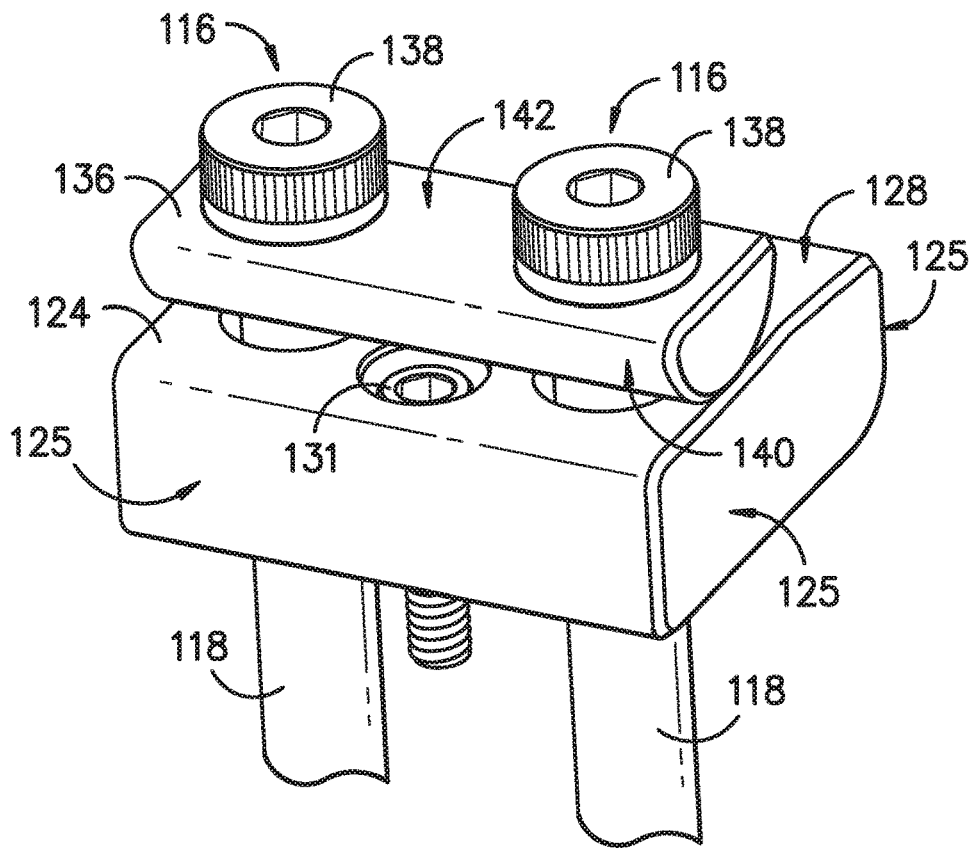
FIG. -4-
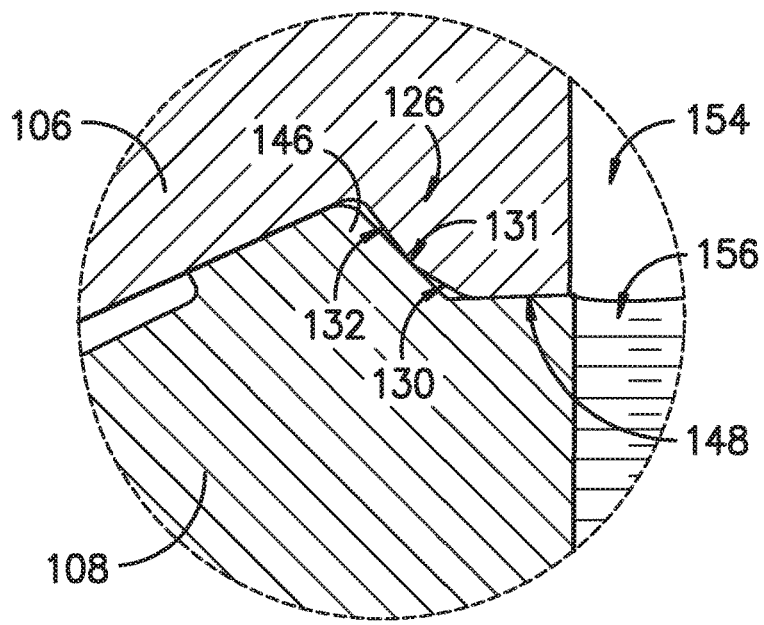
FIG. -5-

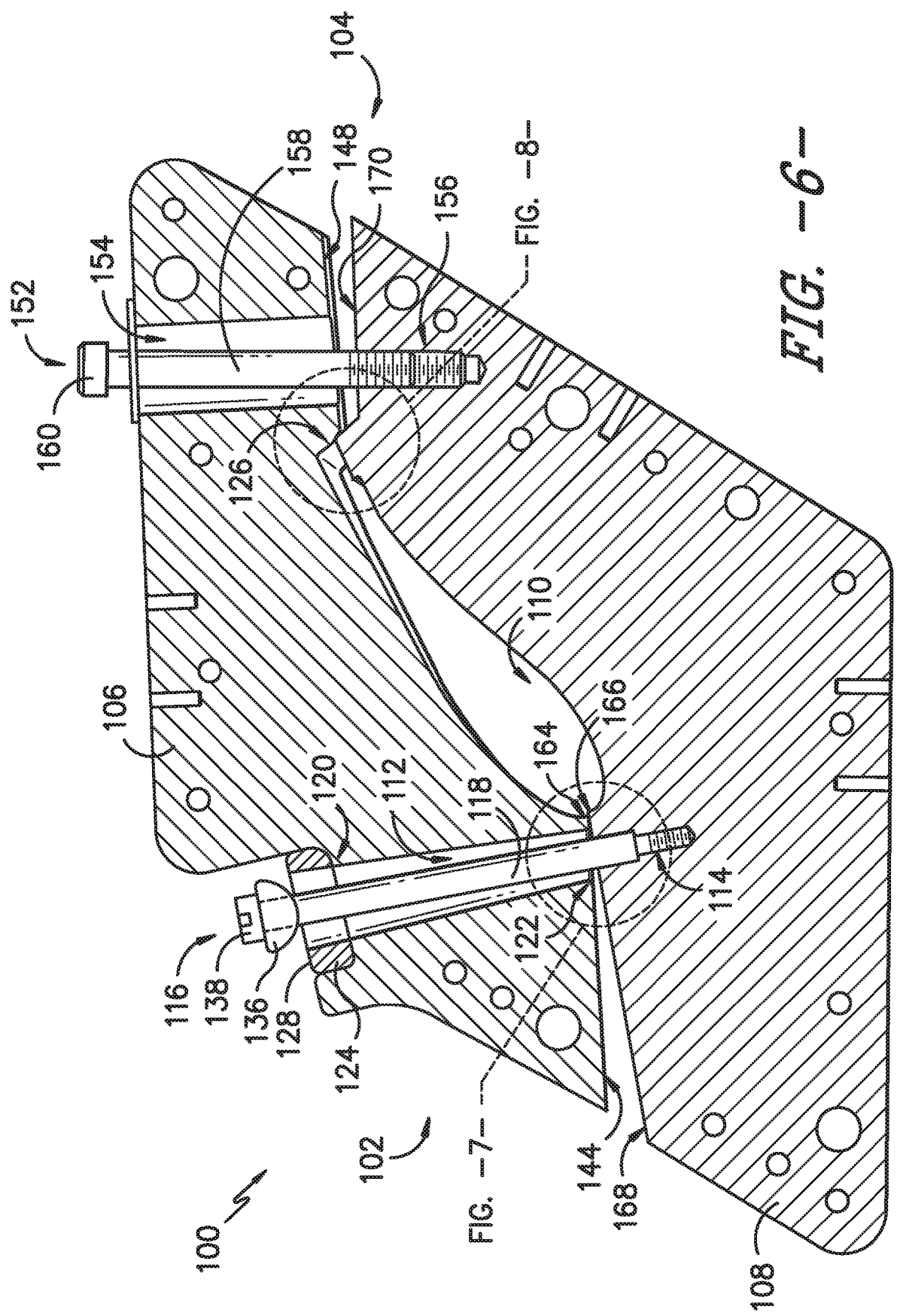

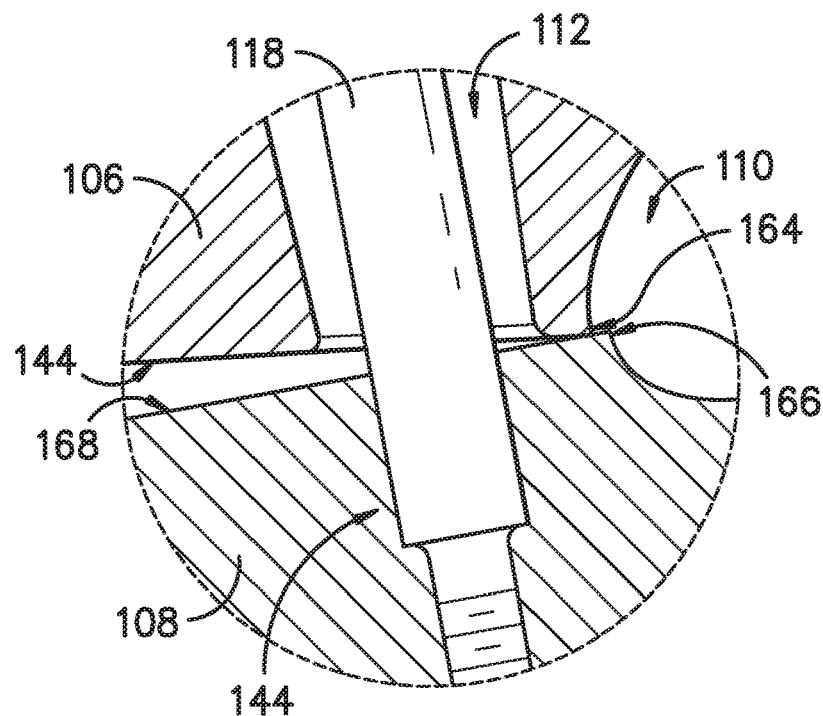
FIG. -7-
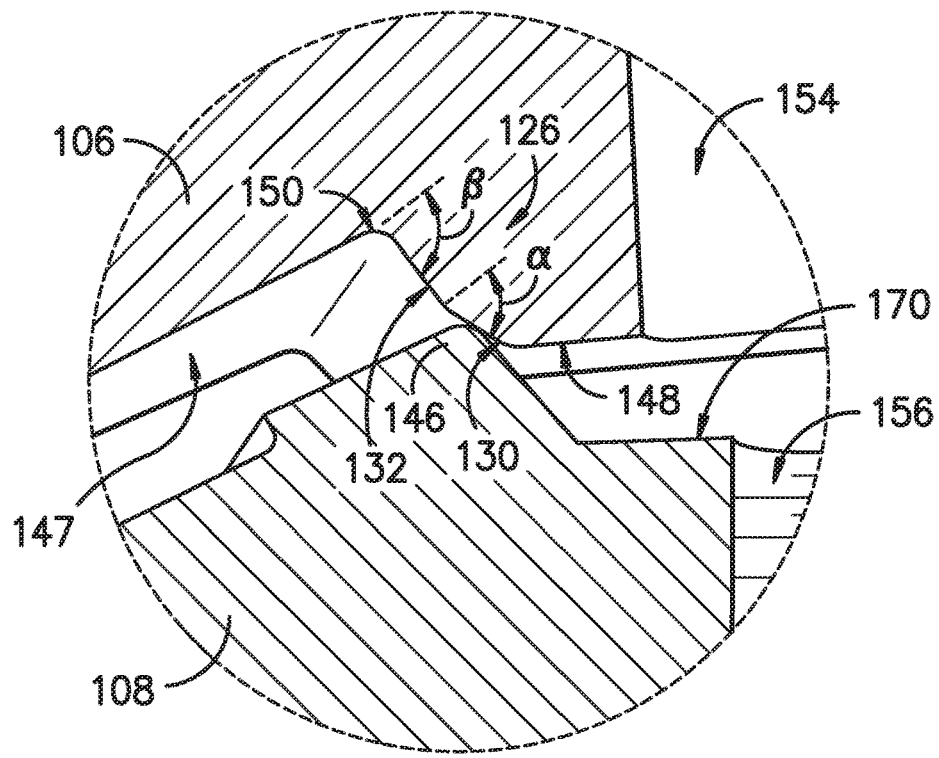
FIG. -8-

TOOLING ASSEMBLY HAVING CAM CLOSING FEATURE

FIELD

The present subject matter relates generally to tooling assemblies for forming articles such as composite components. More particularly, the present subject matter relates to tooling assemblies for shaping composite components such as gas turbine engine airfoils.

BACKGROUND

More commonly, non-traditional high temperature composite materials, such as ceramic matrix composite (CMC) and polymer matrix composite (PMC) materials, are being used in applications such as gas turbine engines. Components fabricated from such materials have a higher temperature capability compared with typical components, e.g., metal components, which may allow improved component performance and/or increased engine temperatures. Composite components may provide other advantages as well, such as an improved strength to weight ratio.

Often, composite components are formed at least in part from a plurality of plies of the composite material. The composite plies may be cut from a tape or sheet of a composite matrix, which also may comprise other constituents such as solvents and binders, and then stacked to form a composite ply layup. The layup may then be placed within a tooling assembly for processing, e.g., for compaction and curing in an autoclave. Typically, the tooling assembly includes a plurality of bolts requiring a specific bolt torqueing sequence. An improper bolt torqueing sequence could pinch a portion of the layup, e.g., the leading edge of an airfoil layup, or could produce ply buckling. Moreover, opposing bolts often need multiple rounds of loosening and retightening to properly close the tooling assembly. Therefore, typical tooling assemblies have complicated closing processes, thereby increasing the processing time and the technical skill required by an operator, which can increase part cost, and lowering yield while reducing the likelihood of properly closing the assembly for each part.

Accordingly, improved tooling assemblies would be useful. In particular, a tooling assembly having features that simplify a closing process of the tooling assembly and ensure the segments of the tooling assembly are properly aligned would be beneficial. Further, a tooling assembly that ensures proper alignment of the tool segments even when a composite layup positioned within the tooling assembly has a varying thickness would be desirable.

BRIEF DESCRIPTION

Aspects and advantages of the invention will be set forth in part in the following description, or may be obvious from the description, or may be learned through practice of the invention.

In one exemplary embodiment of the present subject matter, a tooling assembly is provided. The tooling assembly has a forward end and an aft end. The tooling assembly comprises a first tool segment, a second tool segment, a forward cam portion near the forward end of the tooling assembly, and an aft cam portion near the aft end of the tooling assembly. The forward cam portion defines a follower surface, and at least a portion of the follower surface has a curvilinear profile. The aft cam portion defines a first surface extending at a first angle and a second surface extending at a second angle. The first tool segment and the second tool segment define a cavity for shaping an article.

In another exemplary embodiment of the present subject matter, a tooling assembly is provided. The tooling assembly has a forward end and an aft end. The tooling assembly comprises a first tool segment, a second tool segment, a forward cam portion near the forward end of the tooling assembly, and an aft cam portion near the aft end of the tooling assembly. The forward cam portion defines a follower surface, and at least a portion of the follower surface having a curvilinear profile. The aft cam portion defines a first surface extending at a first angle and a second surface extending at a second angle. The tooling assembly also comprises a first fastener that extends through the forward cam portion, the first tool segment, and into the second tool segment, and a second fastener that extends through the first tool segment and into the second tool segment aft of the aft cam portion. The tooling assembly further comprises a rounded insert positioned between a head of the first fastener and the follower surface of the forward cam portion. The first tool segment and the second tool segment define a cavity for shaping an article, and the first tool segment pivots with respect to the second tool segment.

In a further exemplary embodiment of the present subject matter, a method for using a tooling assembly to shape an article is provided. The article is formed from a ceramic matrix composite (CMC) material, and the tooling assembly comprises a first tool segment, a second tool segment, a forward cam portion, and an aft cam portion. The method comprises positioning a CMC preform of the article within a cavity defined by the first tool segment and the second tool segment and inserting a second fastener within an aft end of the tooling assembly until the second fastener is fully inserted within the tooling assembly. Inserting the second fastener pivots the first tool segment with respect to the second tool segment to close the tooling assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-section view of an exemplary gas turbine engine according to various embodiments of the present subject matter.

FIG. 2 provides a schematic cross-section view of an airfoil according to an exemplary embodiment of the present subject matter.

FIG. 3 provides a cross-section view of a tooling assembly in a fully closed position according to an exemplary embodiment of the present subject matter.

FIG. 4 provides a perspective view of a forward cam portion insert for receipt in the tooling assembly of FIG. 3 according to an exemplary embodiment of the present subject matter.

FIG. 5 provides a close-up view of an aft cam portion of the tooling assembly of FIG. 3.

FIG. 6 provides a cross-section view of the tooling assembly of FIG. 3 in a partially closed position according to an exemplary embodiment of the present subject matter.

FIG. 7 provides a close-up view of a forward end interface between a first tool segment and a second tool segment of the tooling assembly of FIG. 6 according to an exemplary embodiment of the present subject matter.

FIG. 8 provides a close-up view of an aft cam portion of the tooling assembly of FIG. 6.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of turbofan engine 10, particularly components within or defining the hot gas path 78, may comprise a composite material, such as a ceramic matrix composite (CMC) or other composite material having high temperature capability. In other embodiments, components in other portions of the engine 10, such as the fan section 14, may be made from a suitable composite material, e.g., a polymer matrix composite (PMC) material. Composite materials generally comprise a fibrous reinforcement material embedded in matrix material, e.g., a ceramic matrix material. The reinforcement material serves as a load-bearing constituent of the composite material, while the matrix of a composite material serves to bind the fibers together and act as the medium by which an externally applied stress is transmitted and distributed to the fibers.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAIV-IIC®), alumina silicates (e.g., Nextel's 440 and 480), and chopped whiskers and fibers (e.g., Nextel's 440 and SAF-FIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

In particular embodiments, airfoils of the turbofan engine 10 are formed from composite materials. As shown in FIG. 2, an exemplary composite airfoil 80 includes a concave pressure side 82 opposite a convex suction side 84. Opposite pressure and suction sides 82, 84 of the airfoil 80 radially extend between an inner end and an outer end along an airfoil span (not shown). Moreover, pressure and suction sides 82, 84 of the airfoil 80 axially extend between a leading edge 86 and an opposite trailing edge 88. The leading and trailing edges 86, 88 extend radially from the inner end to the outer end of the airfoil 80. Further, the pressure and suction sides 82, 84 define an outer surface 90 of the airfoil 80. In some embodiments, the composite airfoil 80 is formed from a CMC material, and in other embodiments, the composite airfoil 80 is formed from a PMC material. In still other embodiments, the composite airfoil 80 is formed from any other suitable composite material. Different airfoils 80 within the turbofan engine 10 may be formed from different composite materials, e.g., depending on the location of the airfoils 80 within the engine 10.

The composite airfoil 80 may be fabricated by forming a preform, fitting a tooling assembly around the preform, autoclaving the preform to cure it, and then further processing the cured preform, e.g., by firing and densifying the cured preform. In exemplary embodiments, the composite airfoil 80 is formed from a plurality of composite plies wrapped around an internal mandrel that forms an internal cavity within the airfoil 80. FIGS. 3-8 illustrate a tooling assembly 100 according to an exemplary embodiment of the present subject matter. The tooling assembly 100 has a forward end 102 and an aft end 104, and the tooling assembly 100 comprises a first tool segment 106 and a second tool segment 108. The first tool segment 106 and the second tool segment 108 together define a cavity 110 for shaping the airfoil 80. That is, the composite airfoil preform fits within the cavity 110 such that the tooling assembly 100 fits around the airfoil preform.

The first tool segment 106 pivots with respect to the second tool segment 108 to close the composite airfoil preform within the cavity 110 of the tooling assembly 100. More particularly, near the forward end 102 of the tooling assembly 100, a first slot 112 is defined in the first tool segment 106 and a first opening 114 is defined in the second tool segment 108. A first fastener 116 is received within the first slot 112 and the first opening 114. As shown in FIGS. 3 and 6, the first slot 112 is wider than a stem 118 of the first fastener 116, and the first slot 112 is tapered from a first end 120 of the slot 112 to a second end 122 of the slot 112, as described in greater detail below. In some embodiments, the first fastener 116 is a shoulder bolt that threadingly engages the second tool segment 108 upon receipt within the first opening 114; the shoulder 119 of the shoulder bolt ensures that the first fastener 116 is inserted to a certain depth, e.g., to maintain the first and second tool segments 106, 108 in contact with one another at the forward end 102 of the tooling assembly 100 as described herein, regardless of how tight the first fastener 116 is secured within the first opening 114. More specifically, the shoulder bolt first fastener 116 is tightened to ensure that the shoulder contacts the bottom of its blind hole, i.e., that the shoulder 119 of the shoulder bolt 116 bottoms out within the first opening 114. Further, as shown in FIG. 3, the diameter of the first opening 114 where the shoulder 119 of the shoulder bolt 116 is received preferably is selected for a tight or close fit with the shoulder bolt 116 to help prevent bending or deflection of the shoulder bolt 116 as it is loaded. No matter what type of first fastener 116 used, when the first fastener 116 is received within the first slot 112 and the first opening 114, the tapered first slot 112 allows the first tool segment 106 to pivot with respect to the second tool segment 108 while the first fastener 116 is positioned within the first slot 112.

Referring still to FIG. 3, the tooling assembly 100 further comprises a forward cam portion 124 near the forward end 102 of the tooling assembly 100 and an aft cam portion 126 near the aft end 104 of the tooling assembly 100. The forward cam portion 124 defines a follower surface 128, and as most clearly illustrated in FIG. 4, at least a portion of the follower surface 128 has an arc-shaped or curvilinear profile. Turning to FIGS. 5 and 8, the aft cam portion 126 defines a first surface 130 and an adjoining second surface 132, which together form a follower surface of the aft cam portion 126 that has a compound angle, as described in greater detail herein. The first surface 130 transitions to the second surface 132 at a transition point 131.

Referring to FIGS. 3 and 4, it will be appreciated that in the depicted embodiment the forward cam portion 124 is an insert that is received within an insert recess 134 defined in the first tool segment 106 and is secured to the first tool segment 106 using a suitable fastener 131. The sides of the insert recess 134 adjacent the sides 125 of the forward cam portion insert 124 help locate the insert within the insert recess 134, and the fastener 131 holds the insert 124 in position. In other embodiments, the forward cam portion 124 and its follower surface 128 may be formed as part of the first tool segment 106 rather than as a separate insert, e.g., the forward cam portion 124 may be a machined-in feature of the first tool segment 106. Further, although illustrated with an arc-shaped, curvilinear, or ramped profile, the follower surface 128 may have any suitable shape for ensuring that the tool segments 106, 108 are properly aligned as the tooling assembly 100 closes around the preform. That is, the follower surface 128 helps guide the first tool segment 106 with respect to the second tool segment 108 as the first tool segment 106 closes the preform within the cavity 110. More specifically, the arc-shaped, curvilinear, or ramped follower surface 128 accommodates the pivoting action of the first tool segment 106 with respect to the second tool segment 108 such that a suction side leading edge 164 of the first tool segment 106 remains in contact with the second tool segment 108 as the first tool segment 106 pivots to close the tooling assembly 100.

Moreover, as depicted in FIGS. 3 and 4, a rounded insert 136 is positioned between a head 138 of the first fastener 116 and the follower surface 128 of the forward cam portion 124. The rounded insert 136 has a curved surface 140 and a flat surface 142; the curved surface 140 contacts the follower surface 128 and the flat surface 142 contacts the head 138 of the first fastener 116. As such, the rounded insert 136 provides a line of contact with the follower surface 128, so that the rounded insert 136 slides easier along the follower surface 128 than the head 138 of the first fastener 116. Further, the rounded insert 136 increases the surface area in contact with the follower surface 128 compared to the fastener head 138, which decreases wear on the forward cam portion 124 due to the sliding contact and allows a smoother closing operation. Additionally, as depicted in FIG. 4, some embodiments of tooling assembly 100 may include more than one first fastener 116, e.g., to increase the line of action and spread the load at the forward end 102 of the tooling assembly. It will be appreciated that each first fastener 116 may be received within a slot in the first tool segment 106 configured like the first slot 112 and an opening in the second tool segment 108 configured like the first opening 114.

As illustrated in FIG. 3, the first slot 112 extends through the forward cam portion 124. As previously described, the first slot 112 is tapered from the first end 120 to the second end 122 opposite the first end 120. More particularly, the first slot 112 is wider at the forward cam portion 124 than at a first interface surface 144 of the first tool segment 106, which interfaces with the second tool segment 108. The first fastener 116 extends within the first slot 112 and first opening 114 such that the head 138 of the first fastener 116 rests on the rounded insert 136 and the stem 118 of the first fastener 116 passes through the rounded insert 136, the forward cam portion 124, and the first tool segment 106 and into the second tool segment 108. Further, as illustrated in FIG. 4, in some embodiments, more than one first fastener 116 may be used, for example, to increase the line of action and spread the load experienced by the first fastener 116.

Referring now to FIGS. 3 and 5, in the illustrated embodiment, the first tool segment 106 defines the aft cam portion 126, and the second tool segment 108 defines a contact portion 146 that contacts the aft cam portion 126. As shown most clearly in FIGS. 5 and 8, the first surface 130 extends at a first angle α and the second surface 132 extends at a second angle β. More particularly, referring to FIG. 8, the first angle α and the second angle β are defined with respect to a suction side trailing edge surface 147, which interfaces with the second tool segment 108. For clarity, the first angle α and second angle β are each depicted as measured from a line that is parallel and tangent to the suction side trailing edge surface 147. The first angle α may be within a range of about 0° to about 90° with respect to the surface 147, and the second angle β may be within a range of about 0° to about 90° with respect to the surface 147. In other embodiments, the difference between the first and second angles α, β may range from about 0° to about 40°. Because the first surface 130 adjoins the second surface 132, the first and second surfaces 130, 132 form one follower surface of the aft cam portion 126 that has a compound angle.

The contact portion 146 slidingly contacts the first surface 130 and second surface 132 such that the first surface 130 and second surface 132 guide the first tool segment 106 as the first tool segment 106 slides with respect to the second tool segment 108. For example, as shown in FIGS. 6 and 8, the contact portion 146 of the second tool segment 108 first contacts the first surface 130 and slides along the first surface 130 as the first tool segment 106 moves with respect to the second tool segment 108 to close the cavity 110. As the first tool segment 106 continues to close around the preform within the cavity 110, the contact portion 146 transitions to contact with the second surface 132 at the transition point 131 between the first surface 130 and the second surface 132. The contact portion 146 then slides along the second surface 132 until, as illustrated in FIGS. 3 and 5, a second interface surface 148 contacts the second tool segment 108 and the contact portion 146 is received within a complementarily shaped contact portion recess 150 (FIG. 8) defined within the first tool segment 106 adjacent the second surface 132.

As depicted in FIGS. 3 and 6, a second fastener 152 is received within a second slot 154, which is defined in the first tool segment 106 aft of the aft cam portion 126, and a second opening 156, which is defined in the second tool segment 108 proximate the second slot 154 when the first and second tool segments 106, 108 are aligned for closing around the preform. As such, the second fastener 152 extends through the first tool segment 106 and into the second tool segment 108 aft of the aft cam portion 126. Like the first slot 112, the second slot 154 is wider than a stem 158 of the second fastener 152. Thus, the first tool segment 106 can pivot with respect to the second tool segment 108 even when the second fastener 152 extends through the first slot 154 and into the second opening 156. In some embodiments, the second fastener 152 is a socket head cap screw, hex head screw, button head screw, but the second fastener 152 can be any suitable fastener.

FIGS. 3 and 6 further illustrate that the first tool segment 106 defines a suction side leading edge 164 and the second tool segment 108 defines a pressure side leading edge 166. The tooling assembly 100 is configured such that, as the first tool segment 106 pivots with respect to the second tool segment 108 with the first fastener 116 received within the first slot 112 and first opening 114, the suction side leading edge 164 maintains contact with a third interface surface 168 of the second tool segment 108. More particularly, the ply layup or preform is positioned within the cavity 110 with the tooling assembly 100 in an open position. When open, the first interface surface 144 of the first tool segment 106 contacts the third interface surface 168 of the second tool segment 108, and the first fastener 116 is received within the first slot 112 and first opening 114. To close the tooling assembly 100, the second fastener 152 is inserted within the second slot 154 and second opening 156. As the second fastener 152 is tightened, e.g., by threadingly engaging with the second tool segment 108 within the second opening 156, the first tool segment 106 pivots about the first cam portion 124, and the second interface surface 148 of the first tool segment 106 moves toward a fourth interface surface 170 of the second tool segment 108, as shown in FIG. 8. That is, the profile of the follower surface 128 of the first cam portion 124 allows the pivoting action of the first tool segment 106 with respect to the second tool segment 108 as the second fastener 152 is tightened, while keeping the suction side leading edge 164 in contact with the third interface surface 168 of the second tool segment 108. As the tooling assembly 100 continues to close, the aft cam portion 126 engages, and the contact portion 146 contacts the first surface 130 of the aft cam portion 126 and slides along the first surface 130. The movement of the contact portion 146 along the first surface 130 may be referred to as a first stage of the aft cam portion 126. The first stage draws the first tool segment 106 aft and aligns the suction side leading edge 164 with the pressure side leading edge 166. Stated differently, as the contact portion 146 slides along the first surface 130 in the first stage of the cam action of the aft cam portion 126, the suction side leading edge 164 slides along the third interface surface 168, as shown in FIG. 7, until the suction side leading edge 164 is aligned with the pressure side leading edge 166. Further, the cam action of the aft cam portion 126 during the first stage pulls aft, i.e., toward the trailing edge, any ply bulk in the suction side surface of the ply layup. The cam action of the forward cam portion 124 maintains the suction side leading edge 164 in contact with the third interface surface 168 of the second tool segment 108.

As the tooling assembly 100 continues to close, the first tool segment 106 continues to pivot about the forward cam portion 124 as the rounded insert 136 travels along the follower surface 128. The contact portion 146 passes over the transition point 131, transitions from contact with the first surface 130 to the second surface 132 of the aft cam portion 126, and slides along the second surface 132. The movement of the contact portion 146 along the second surface 132 may be referred to as a second stage of the aft cam portion 126. The second stage maintains contact between the first tool segment 106 and the second tool segment 108 as the tooling assembly 100 closes to compact the plies within the cavity 110. More specifically, the second stage (i.e., movement of the contact portion 146 along the second surface 132, which extends at the second angle β) accommodates variations in thickness of the plies within the cavity 110 to keep the first and second tool segments 106, 108 in contact at the suction and pressure side leading edges 164, 166. That is, the plies forming the layup positioned within the cavity 110 may have a variable cured ply thickness (CPT), which is the final thickness of a cured/compacted laminate composite ply. Using a compound angle for the aft cam portion 126, i.e., transitioning from the first surface 130 to the second surface 132, allows the tooling assembly 100 to fully close while accommodating CPT variations and take up any bulk at the aft end of the layup without losing contact between the tool segments 106, 108 at the forward end 102 of the tooling assembly 100.

Thus, as described herein, the tooling assembly 100 is configured such that the forward and aft cam portions 124, 126 work simultaneously to completely close the cavity 110 while drawing down ply bulk and aligning the tool segments 106, 108 to prevent gaps or steps from forming in the article within the cavity 110. As the first tool segment 106 pivots with respect to the second tool segment 108 and the contact portion 146 slides along the first and second surfaces 130, 132, the rounded insert 136 travels along the follower surface 128 of the forward cam portion 124. The contact between the first fastener 116 and the forward cam portion 124, through contact between the first fastener head 138 and the rounded insert 136 that contacts the follower surface 128, helps maintain contact between the first and second tool segments 106, 108 at the forward end 102. More particularly, as shown in FIG. 4, the follower surface 128 has a profile that includes an arc-shaped, curvilinear, or ramped middle portion, which helps ensure the tool segments 106, 108 do not loosen up with respect to one another at the forward end 102 as the first tool segment 106 draws back at the aft end 104 during the first stage of the cam action. As the cam action transitions to the second stage, the profile of the follower surface 128 transitions to a generally flat or planar profile to help ensure the tool segments 106, 108 maintain contact at the suction and pressure side leading edges 164, 166, which were brought into alignment with one another during the first stage, as the first stage 106 pivots to close the cavity 110 at the aft end 104. Maintaining contact between the tool segments 106, 108 at the forward end 102 of the tooling assembly 100 helps avoid a pinch point, a step in the resulting airfoil 80, poor compaction, and the like. Thus, it will be appreciated that the tooling assembly 100 utilizes one sliding action to draw down any bulk in the layup and close the tooling assembly 100 without pinching any plies or leaving any gaps between the tool segments. Further, as described herein, the profile of each cam portion 124, 126 maintains contact between the tool segments 106, 108 to ensure the tool segments fully close without pinching plies or leaving any gaps between the tool segments as the tooling assembly 100 closes and the suction and pressure side leading edges 164, 166 align.

The tooling assembly 100 is fully closed when the second interface surface 148 contacts the fourth interface surface 170. When the tooling assembly 100 is fully closed, the contact portion 146 may be received within the contact portion recess 150. Moreover, as described above, closing the tooling assembly 100 requires tightening of only the second, aft fastener 152. In some embodiments, more than one second fastener 152 may be used.

As previously described, the tooling assembly 100 may be used in the fabrication of CMC airfoils 80. As described herein, after laying up the CMC plies to form the layup or preform, the preform is debulked and, if appropriate, cured while subjected to elevated pressures and temperatures to produce a preform. More particularly, the tooling assembly 100 may be used to debulk and compact the plies, which helps impart a final shape of the airfoil 80 to the plies, and the preform may be cured within the tooling assembly, e.g., in an autoclave to form an autoclaved body. In exemplary embodiments, the autoclaved body is then heated (fired) in a vacuum or inert atmosphere to decompose the binders, remove the solvents, and convert the precursor to the desired ceramic matrix material. Due to decomposition of the binders, the result is a porous CMC fired body that may undergo densification, e.g., melt infiltration (MI), to fill the porosity and yield the CMC component. Specific processing techniques and parameters for the above process will depend on the particular composition of the materials. For example, silicon CMC components may be formed from fibrous material that is infiltrated with molten silicon, e.g., through a process typically referred to as the Silcomp process. Another technique of manufacturing CMC components is the method known as the slurry cast melt infiltration (MI) process. In one method of manufacturing using the slurry cast MI method, CMCs are produced by initially providing plies of balanced two-dimensional (2D) woven cloth comprising silicon carbide (SiC)-containing fibers, having two weave directions at substantially 90° angles to each other, with substantially the same number of fibers running in both directions of the weave. The term "silicon carbide-containing fiber" refers to a fiber having a composition that includes silicon carbide, and preferably is substantially silicon carbide. For instance, the fiber may have a silicon carbide core surrounded with carbon, or in the reverse, the fiber may have a carbon core surrounded by or encapsulated with silicon carbide.

Other techniques for forming CMC components include polymer infiltration and pyrolysis (PIP) and oxide/oxide processes. In PIP processes, silicon carbide fiber preforms are infiltrated with a preceramic polymer, such as polysilazane and then heat treated to form a SiC matrix. In oxide/oxide processing, aluminum or alumino-silicate fibers may be pre-impregnated and then laminated into a preselected geometry. Components may also be fabricated from a carbon fiber reinforced silicon carbide matrix (C/SiC) CMC. The C/SiC processing includes a carbon fibrous preform laid up on a tool in the preselected geometry. As utilized in the slurry cast method for SiC/SiC, the tool, e.g., tooling assembly 100, is made up of graphite material. The fibrous preform is supported by the tooling assembly 100 during a chemical vapor infiltration process at about 1200° C., whereby the C/SiC CMC component is formed. In still other embodiments, 2D, 2.5D, and/or 3D preforms may be utilized in MI, CVI, PIP, or other processes. For example, cut layers of 2D woven fabrics may be stacked in alternating weave directions as described above, or filaments may be wound or braided and combined with 3D weaving, stitching, or needling to form 2.5D or 3D preforms having multiaxial fiber architectures. Other ways of forming 2.5D or 3D preforms, e.g., using other weaving or braiding methods or utilizing 2D fabrics, may be used as well.

Optionally, after processing, the CMC component (i.e., CMC airfoil 80) may be finish machined, if and as needed, and coated with one or more coatings, such as an environmental barrier coating (EBC). Moreover, the method described above is provided by way of example only. As an example, other known methods or techniques for curing composite plies, as well as for densifying a CMC component, may be utilized. Alternatively, any combinations of these or other known processes may be used. Further, although in the exemplary embodiments described herein the tooling assembly 100 is used to shape an airfoil of a gas turbine engine, such as the composite airfoil 80 shown in FIG. 2, it will be appreciated that the tooling assembly 100 could be configured such that the tooling assembly 100 is used to shape another article, i.e., an article of manufacture other than an airfoil. For instance, the cavity 110 may have any suitable shape for receiving a layup or preform of any gas turbine engine component suitably formed using tooling assembly 100. As a further example, although described and illustrated herein as having two tool halves 106, 108, the tooling assembly 100 may comprise any suitable number of tool segments e.g., to accommodate articles having different shapes than the airfoil 80. Moreover, the tooling assembly 100 may be split into a different number of tool segments to accommodate different sized articles, such as a larger or smaller airfoil 80.

Additionally, the forward and aft cam portions 124, 126 are described as such to denote their proximate locations in the depicted embodiment and could alternatively be referred to as first and second cam portions 124, 126. It will be appreciated that the cam portions 124, 126 could be defined at any suitable location within the tooling assembly 100, and additional cam portions, e.g., third, fourth, etc. cam portions, could be included to ensure the tooling assembly remains aligned and properly closes around the article preform. Further, in other embodiments, the aft cam portion 126 may comprise other surfaces than first and second surfaces 130, 132 that form a follower surface of the cam portion 126 having a compound angle, e.g., the cam portion 126 may comprise three surfaces that are each at a different angle with respect to the second interface surface 148. Similarly, the first cam portion 124 may include a follower surface 128 having any suitable profile for maintaining the tool segments in contact with one another, e.g., at or near critical sections of the article being shaped within the tooling assembly 100. Moreover, although described and illustrated herein as part of or received in the first tool segment 106, the forward cam portion could be part of or received in the second tool segment 108, and likewise, the second tool segment 108 could define the aft cam portion 126 while the first tool segment 106 defines the contact portion 146. In addition, some embodiments of the tooling assembly 100 may omit the first fastener 116 and/or the second fastener 152 and utilize a different mechanism, e.g., a single or multi-stage press, to produce a similar action or motion as the fasteners 116, 152. Still further embodiments may incorporate other variations in the configuration of the tooling assembly 100 and/or its components.

Accordingly, as described herein, a tooling assembly for a composite component incorporates features that simplify a closing process of the tooling assembly and ensure the segments of the tooling assembly are properly aligned, even when a composite layup positioned within the tooling assembly has a varying thickness, e.g., from a forward end to an aft end. More particularly, the tooling assembly described herein is closed by tightening only one set of bolts, i.e., aft fastener(s) 152. Such simplification of the closing process can reduce part costs due to a lower processing time, as well as reduce the operator technical skill required to perform the closing process. Further, the cam closing features, i.e., forward cam portion 124 and aft cam portion 126, ensure the forward tooling edges remain in contact as the tooling assembly closes, which allows the tooling assembly to accommodate varying thicknesses of the plies forming a layup positioned within the tooling assembly and to provide good compaction of the layup. In addition, the tooling assembly described herein includes a first tool segment that pivots with respect to a second tool segment to open and close, which allows the tooling assembly to accommodate more complex layup shapes, as well as layups with larger bulk. Moreover, the cam closing features draw the ply bulk tightly aft during closing while maintaining contact between the forward portion of the tool segments, which helps eliminate ply bulking and voids while achieving good compaction. Additionally, the tooling assembly described herein can produce better formed component shapes, such as a better formed airfoil shape, compared to known tooling assemblies. What is more, forming the forward cam portion 124 as an insert that is received in the tooling assembly facilitates replacement of the forward cam portion 124 if it is damaged. Other advantages of the subject matter described herein also may be realized by those of ordinary skill in the art.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A tooling assembly having a forward end and an aft end, the tooling assembly comprising:
   a first tool segment;
   a second tool segment;
   a forward cam portion near the forward end of the tooling assembly, the forward cam portion defining a follower surface, at least a portion of the follower surface having a curvilinear profile;
   an aft cam portion near the aft end of the tooling assembly, the aft cam portion defining a follower surface, the follower surface comprising a first surface extending at a first angle and a second surface extending at a second angle; and a first fastener received within a first slot defined in the forward cam portion and the first tool segment and a first opening in the second tool segment, wherein the first tool segment and the second tool segment define a cavity for shaping an article, and wherein the first slot is tapered such that the first slot is wider at the forward cam portion than at a first interface surface of the first tool segment.

2. The tooling assembly of claim 1, wherein the first tool segment pivots with respect to the second tool segment.

3. The tooling assembly of claim 1, wherein the first tool segment defines the first surface and the second surface, wherein the first angle and the second angle are defined with respect to an interface surface of the first tool segment, and wherein the first surface adjoins the second surface.

4. The tooling assembly of claim 1, wherein the forward cam portion is an insert that is received within an insert recess in the first tool segment.

5. The tooling assembly of claim 1, wherein the first tool segment defines the aft cam portion, and wherein the second tool segment defines a contact portion that contacts the aft cam portion.

6. The tooling assembly of claim 1, further comprising:
a rounded insert having a curved surface and a flat surface,
wherein the rounded insert is positioned between a head of the first fastener and the follower surface of the forward cam portion such that the curved surface contacts the follower surface and the flat surface contacts the head of the first fastener.

7. The tooling assembly of claim 1, wherein the article is an airfoil of a gas turbine engine.

8. The tooling assembly of claim 7, wherein the first tool segment defines a suction side leading edge, and wherein the suction side leading edge maintains contact with the second tool segment as the first tool segment pivots with respect to the second tool segment to engage the forward and aft cam portions.

9. The tooling assembly of claim 7, wherein the airfoil is formed from a composite material.

10. A tooling assembly having a forward end and an aft end, the tooling assembly comprising:
a first tool segment;
a second tool segment;
a forward cam portion near the forward end of the tooling assembly, the forward cam portion defining a follower surface, at least a portion of the follower surface having a curvilinear profile;
an aft cam portion near the aft end of the tooling assembly, the aft cam portion defining a follower surface, the follower surface comprising a first surface extending at a first angle and a second surface extending at a second angle;
a first fastener extending through the forward cam portion, the first tool segment, and into the second tool segment;
a second fastener extending through the first tool segment and into the second tool segment aft of the aft cam portion; and
a rounded insert positioned between a head of the first fastener and the follower surface of the forward cam portion,
wherein the first tool segment and the second tool segment define a cavity for shaping an article, and wherein the first tool segment pivots with respect to the second tool segment.

11. The tooling assembly of claim 10, wherein the first fastener is received within a first slot that is defined in the forward cam portion and the first tool segment, and wherein the first slot is tapered such that the first slot is wider at the forward cam portion than at a first interface surface of the first tool segment.

12. The tooling assembly of claim 10, wherein the first tool segment defines the first surface and the second surface, wherein the first angle and the second angle are defined with respect to an interface surface of the first tool segment, and wherein the first surface adjoins the second surface.

13. The tooling assembly of claim 10, wherein the second fastener is received within a second slot that is defined in the first tool segment.

14. The tooling assembly of claim 10, wherein the forward cam portion is an insert that is received within an insert recess in the first tool segment.

15. The tooling assembly of claim 10, wherein the first tool segment defines the aft cam portion, and wherein the second tool segment defines a contact portion that contacts the aft cam portion.

16. The tooling assembly of claim 10, wherein the article is a ceramic matrix composite airfoil of a gas turbine engine.

17. A method for using a tooling assembly to shape an article, the article formed from a ceramic matrix composite (CMC) material, the tooling assembly comprising a first tool segment, a second tool segment, a forward cam portion near the forward end of the tooling assembly, and an aft cam portion near the aft end of the tooling assembly, the method comprising:
positioning a CMC preform of the article within a cavity defined by the first tool segment and the second tool segment; and
inserting a second fastener within an aft end of the tooling assembly until the second fastener is fully inserted within the tooling assembly,
wherein inserting the second fastener pivots the first tool segment with respect to the second tool segment to close the tooling assembly,
wherein the forward cam portion is an insert that is received within an insert recess in the first tool segment,
wherein the forward cam portion defines a follower surface, at least a portion of the follower surface having a curvilinear profile, and
wherein the aft cam portion defines a follower surface, the follower surface comprising a first surface extending at a first angle and a second surface extending at a second angle.

18. The method of claim 17, wherein, as the second fastener is inserted, the aft cam portion engages to maintain the first and second tool segments in contact at a forward end of the tooling assembly and to close the tooling assembly, wherein when the aft cam portion engages, a contact portion of the second tool segment contacts and slides along a first surface of the first tool segment until the contact portion reaches a transition point and transitions to contacting and sliding along a second surface of the first tool segment.

19. The method of claim 18, wherein the forward cam portion comprises a follower surface and a rounded insert, a first fastener extending through the forward cam portion, the first tool segment, and the second tool segment such that a head of the first fastener contacts the rounded insert, the rounded insert traveling along the follower surface as the contact portion slides along the first surface and the second surface.

* * * * *